United States Patent
Singler, Jr. et al.

(10) Patent No.: US 11,435,939 B2
(45) Date of Patent: Sep. 6, 2022

(54) AUTOMATED TIERING OF FILE SYSTEM OBJECTS IN A COMPUTING SYSTEM

(71) Applicant: VMware, Inc., Palo Alto, CA (US)

(72) Inventors: Ronald Gerard Singler, Jr., Lakeland, FL (US); Cormac Hogan, Ballincollig (IE); Duncan Epping, Helmond (NL)

(73) Assignee: VMWARE, INC., Palo Alto, CA (US)

( * ) Notice: Subject to any disclaimer, the term of this patent is extended or adjusted under 35 U.S.C. 154(b) by 1 day.

(21) Appl. No.: 16/742,454

(22) Filed: Jan. 14, 2020

(65) Prior Publication Data

US 2021/0216234 A1 Jul. 15, 2021

(51) Int. Cl.
*G06F 3/06* (2006.01)
*G06F 9/455* (2018.01)

(52) U.S. Cl.
CPC ............ *G06F 3/0653* (2013.01); *G06F 3/061* (2013.01); *G06F 3/067* (2013.01); *G06F 3/0631* (2013.01); *G06F 3/0659* (2013.01); *G06F 3/0664* (2013.01); *G06F 9/45558* (2013.01); *G06F 2009/45583* (2013.01); *G06F 2009/45595* (2013.01)

(58) Field of Classification Search
CPC ...... G06F 3/0653; G06F 3/0631; G06F 3/067; G06F 9/45558; G06F 2009/45583
See application file for complete search history.

(56) References Cited

U.S. PATENT DOCUMENTS

| | | | |
|---|---|---|---|
| 10,489,074 B1* | 11/2019 | Gritter | G06F 3/0611 |
| 10,521,124 B1* | 12/2019 | Aharoni | G06F 3/0631 |
| 2013/0297869 A1* | 11/2013 | Mills | G06F 3/061 711/112 |
| 2020/0036604 A1* | 1/2020 | Kalman | G06F 3/0659 |
| 2020/0272351 A1* | 8/2020 | Iizawa | G06F 3/068 |

* cited by examiner

*Primary Examiner* — Edward J Dudek, Jr.
(74) *Attorney, Agent, or Firm* — Patterson & Sheridan, LLP (57) ABSTRACT

In an example, a method of allocating storage objects of a virtual machine across storage devices in a computing system includes: collecting capabilities of the storage devices in the computing system; assigning a tier of a plurality of tiers to each of the storage devices in the computing system; collecting performance data for the storage devices across a period of time; analyzing the performance data and the capabilities to determine a placement of storage objects of the virtual machine across the plurality of tiers; and moving the storage objects to respective ones of the storage devices based on the assigned tiers.

17 Claims, 5 Drawing Sheets

AUTOMATED TIERING OF FILE SYSTEM OBJECTS IN A COMPUTING SYSTEM

BACKGROUND

Cloud architectures are used in cloud computing and cloud storage systems for offering infrastructure-as-a-service (IaaS) cloud services. Examples of cloud architectures include the VMware Cloud for AWS, VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks. These services can run on a hyperconverged infrastructure, which virtualizes elements of conventional hardware-defined systems (e.g., hypervisors, virtual software-defined storage, virtualized networking, etc.).

In a hyperconverged solution, often times file system objects will be placed on a single tier of storage no matter the performance characteristics or economics required for the workload placed on the object. The result of this brute force placement results in too much or too little performance being allocated to an object and causes additional cost for the end user of the system. As system operators look to implement newer and faster technologies, greater gaps in performance and capacity characteristics of the implemented hyperconverged clusters are created and thus there is a larger disparity in the costs associated with storing objects within a hyperconverged system.

SUMMARY

One or more embodiments provide techniques for automated tiering of file system objects in a computing system. In an embodiment, a method of allocating storage objects of a virtual machine across storage devices in a computing system includes: collecting capabilities of the storage devices in the computing system; assigning a tier of a plurality of tiers to each of the storage devices in the computing system; collecting performance data for the storage devices across a period of time; analyzing the performance data and the capabilities to determine a placement of storage objects of the virtual machine across the plurality of tiers; and moving the storage objects to respective ones of the storage devices based on the assigned tiers.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more embodiments provide techniques for automated tiering of file system objects in a computing system. By utilizing systems with different performance and capacity characteristics within same cluster or different clusters, the techniques allow for the most performant and economical choice of placement for a virtual machine's file system objects. The described techniques provide automated movement of file system objects across tiers of storage infrastructure within a hyperconverged infrastructure cluster or aggregate of clusters. Utilizing performance data gathered by the system, the system is configured to move objects to the most economical tier of storage either within the same cluster or to a lower performance tier cluster within the same physical location. Further, should the system decide it is more economical to move the entire virtual machine's data set (e.g., all file system objects for a virtual machine or container) to another physical location (data center or cloud), and stay within policy constraints, the system is configured to move the entire virtual machine and all data to that tier. These and further aspects are discussed below with respect to the drawings.

Figure 1:
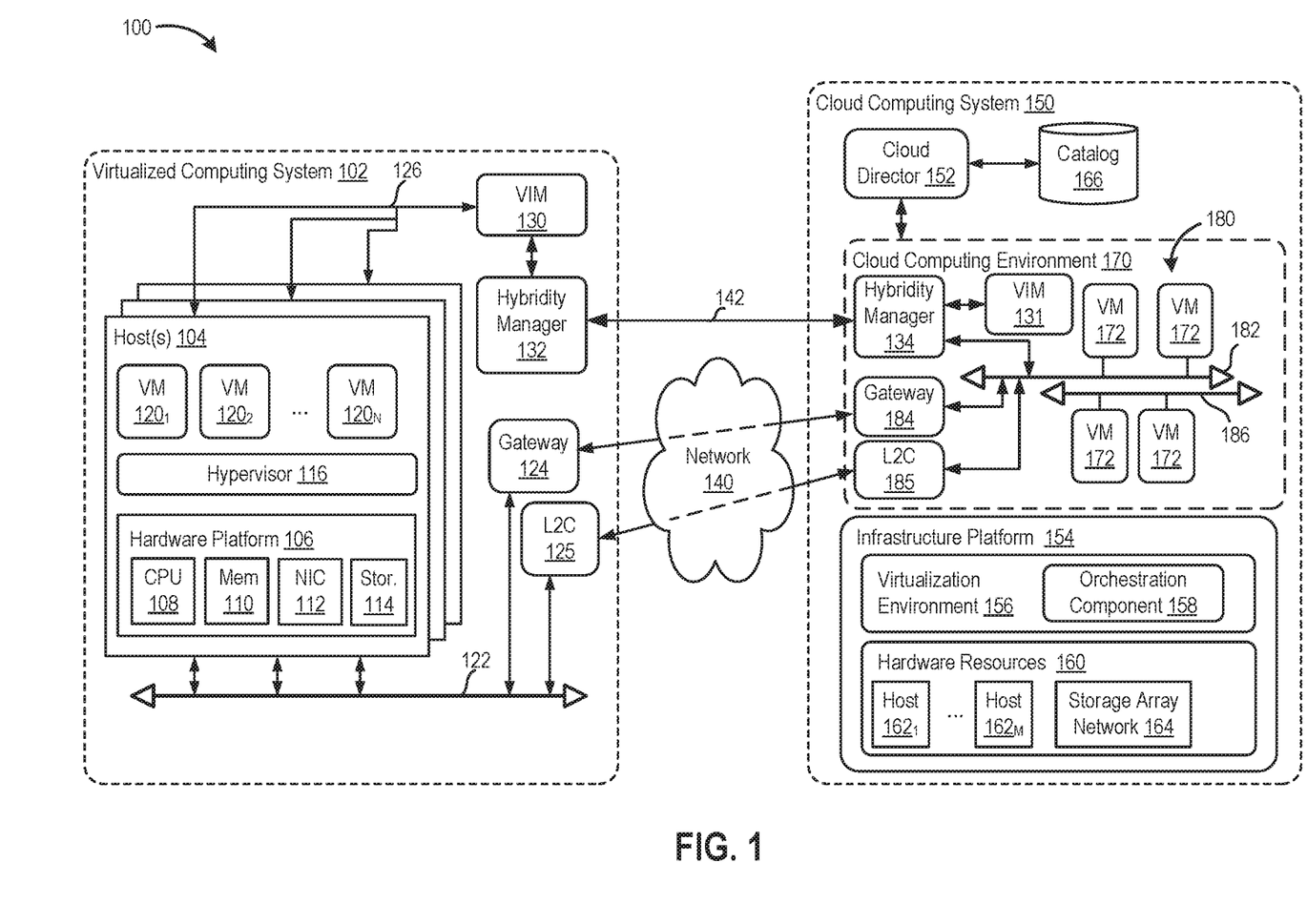
FIG. 1 is a block diagram of a hybrid cloud computing system, according to one embodiment disclosed herein.

FIG. 1 is a block diagram illustrating a hyperconverged computing system 100 in which one or more embodiments of the present disclosure may be utilized. Hyperconverged computing system 100 includes a virtualized computing system 102 and a cloud computing system 150. Hyperconverged computing system 100 is configured to provide a common platform for managing and executing virtual workloads seamlessly between virtualized computing system 102 and cloud computing system 150. Although virtualized computing system 102 and cloud computing system 150 are shown for illustratively purposes, a hybrid cloud computing system may generally include any number of data centers.

In one embodiment, virtualized computing system 102 may be a data center controlled and administrated by a particular enterprise or business organization, while cloud computing system 150 may be operated by a cloud computing service provider and exposed as a service available to account holders, such as the particular enterprise in addition to other enterprises. In such a case, virtualized computing system 102 may be referred to as an on-premises data center(s), and cloud computing system 150 may be referred to as a "public" cloud service. In some embodiments, virtualized computing system 102 may be configured as a private cloud service providing cloud services to various organizations within the enterprise. In other embodiments, virtualized computing system 102 and cloud computing system 150 may both be public clouds.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In a hybrid cloud, a tenant may be provided with seamless access to one or more private cloud resources and/or public cloud resources.

Virtualized computing system 102 includes one or more host computer systems 104. Each of hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processors 108 are configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as networks 122 and 126 within virtualized computing system 102. Network interface 112 may include one or more network adapters, also referred to as network interface cards (NICs). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines 120₁ to 120N (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere® solution made commercially available from VMware, Inc. Hypervisor 116 may run on top of the operating system of host 104 or directly on hardware components of host 104. In addition, hypervisor 116 may provide a virtual switch (not shown), which is a software-based switch acting as a layer 2 (L2) forwarding engine and capable of performing VLAN tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 includes a virtualization management module (depicted in FIG. 1 as virtualized infrastructure manager (VIM) 130) that may communicate with the plurality of hosts 104 via network 126, sometimes referred to as a management network. In one embodiment, VIM 130 is a computer program that resides and executes in a central server, which may reside in virtualized computing system 102, or alternatively, VIM 130 may run as a VM in one of hosts 104. One example of a VIM is the vCenter Server® product made available from VMware, Inc. VIM 130 is configured to carry out administrative tasks for virtualized computing system 102, including managing hosts 104, managing VMs 120 running within each host 104, provisioning VMs, migrating VMs from one host to another host, and load balancing between hosts 104.

As shown, virtualized computing system 102 further includes a hybridity manager 132 that is in communication with VIM 130 and configured to manage and integrate virtualized computing resources provided by cloud computing system 150 with virtualized computing resources of computing system 102 to form a unified "hybrid" computing platform. In one embodiment, hybridity manager 132 is configured to deploy VMs in cloud computing system 150, transfer VMs from virtualized computing system 102 to cloud computing system 150, and perform other "cross-cloud" administrative tasks, as described in greater detail later. Although shown as a separate computer program, which may execute in a central server or run in a VM in one of hosts 104, hybridity manager 132 may alternatively be a module or plug-in complement to VIM 130.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to connect to and communicate with virtualized computing system 102 using a high-throughput, dedicated link between virtualized computing system 102 and cloud computing system 150. Layer 2 concentrators (L2C) 125 and 185 are parallel to gateways 124 and 184 and configured to provide a "stretched" L2 network that spans virtualized computing system 102 and cloud computing system 150. The stretched network may be separate from the network used by gateways 124 and 184 so that, e.g., VM migration traffic over network used by gateways 124 and 183 does not create latency in stretched network.

As shown, cloud computing system 150 includes a hybridity manager 134 configured to communicate with the corresponding hybridity manager 132 in virtualized computing system 102 to enable a common virtualized computing platform between virtualized computing system 102 and cloud computing system 150. Hybridity manager 134 (e.g., executing as a virtual machine) may communicate with hybridity manager 132 using Internet-based traffic via a VPN tunnel established between gateways 124 and 184, or alternatively, using direct connect 142. In addition, hybridity manager 134 is in communication with a VIM 131, which may perform similar functionalities as VIM 130, described above.

Figure 2:
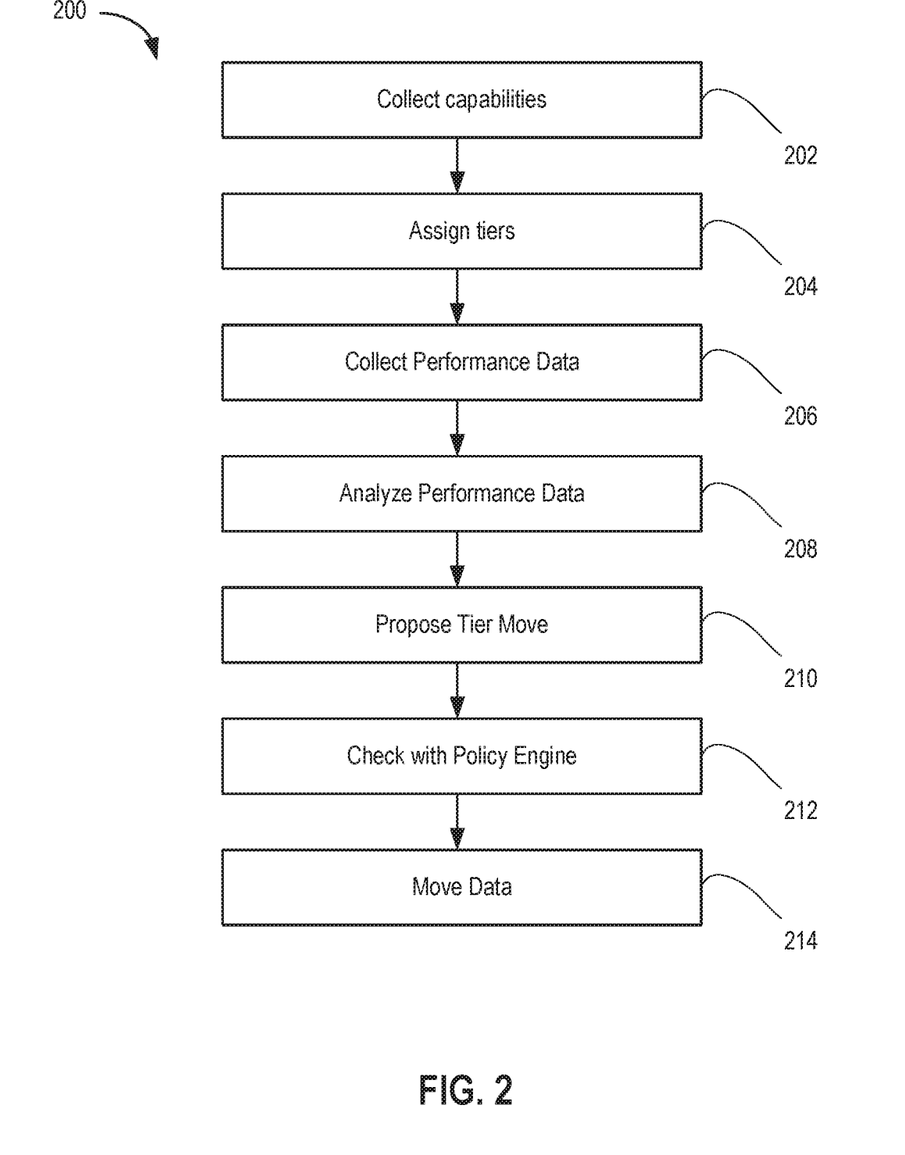
FIG. 2 is a flow diagram depicting a method of tiering file system objects according to an embodiment.

FIG. 2 is a flow diagram depicting a method 200 of tiering file system objects according to an embodiment. VMs comprise a number of storage objects, such as virtual disks, home namespace, swap, snapshot delta disks, and the like. Each storage object comprises one or more components. The number of components in a storage object depends primarily on the size of the storage object and the storage policy assigned to the storage object. The user defines the capabilities that a storage object requires. The system maintains these capabilities throughout the analysis and movement of storage objects described below. The user-defined capabilities can be defined as Service Level Objectives (SLOs). These capabilities include input/output (I/O) latency, protection schemes, type of storage (e.g., file, block, local, remote, access protocol, etc.), capacity, and the like.

Method 200 begins at step 202, where cloud computing system 150 collects capabilities of storage devices attached to each host. Storage device capabilities include I/O, storage latency, network latency, capacity characteristics, and the like. Cloud computing system 150 stores the capabilities of the storage devices in a database or the like for later use during the process. In addition, cloud computing system 150 can collect capabilities of storage available in logical data centers in other physical locations, be it in the cloud or another on-premises location owned by the end user.

At step 204, cloud computing system 150 assigns tiers of capabilities to the storage devices and groups the storage devices accordingly based on tier. Tiers can be within a single host (e.g., the different storage devices in a single host), across hosts within a single cluster, or across clusters within a physical location. At steps, 206 and 208, cloud computing system 150 collects and analyzes performance and capacity trends to determine proper initial placement of storage objects. At step 210, cloud computing system 150 proposes tier moves for one or more storage objects (e.g., move from one tier of storage to another tier of storage). At step 212, cloud computing system 150 moves any storage objects that can be moved to a different tier.

When collecting data, the collection period of performance and capacity data can be done over a rolling period of time. Cloud computing system 150 can then determine the busiest subset of time of the collected period and base the initial placement analysis on those busiest time periods. As more data is collected, a historical analysis can be made to ensure that storage objects will move to the proper tier based on perceived upcoming workloads. Cloud computing system 150 analyzes the collected data to determine proper initial placement, as well as determining where to best store storage objects over periods of time selectable by the user. If it is more economical to move all objects that are owned by a VM, and remain within the policy constraints, then cloud computing system 150 moves all objects to the tier of storage selected. Once a decision about placement has been determined, cloud computing system 150 will analyze the proposed placement choice with the current storage policy for the VM as defined by the user. If it is determined that the VMs objects can move and stay within the assigned policy, cloud computing system 150 will then move the selected objects to the appropriate tier.

Figure 3:
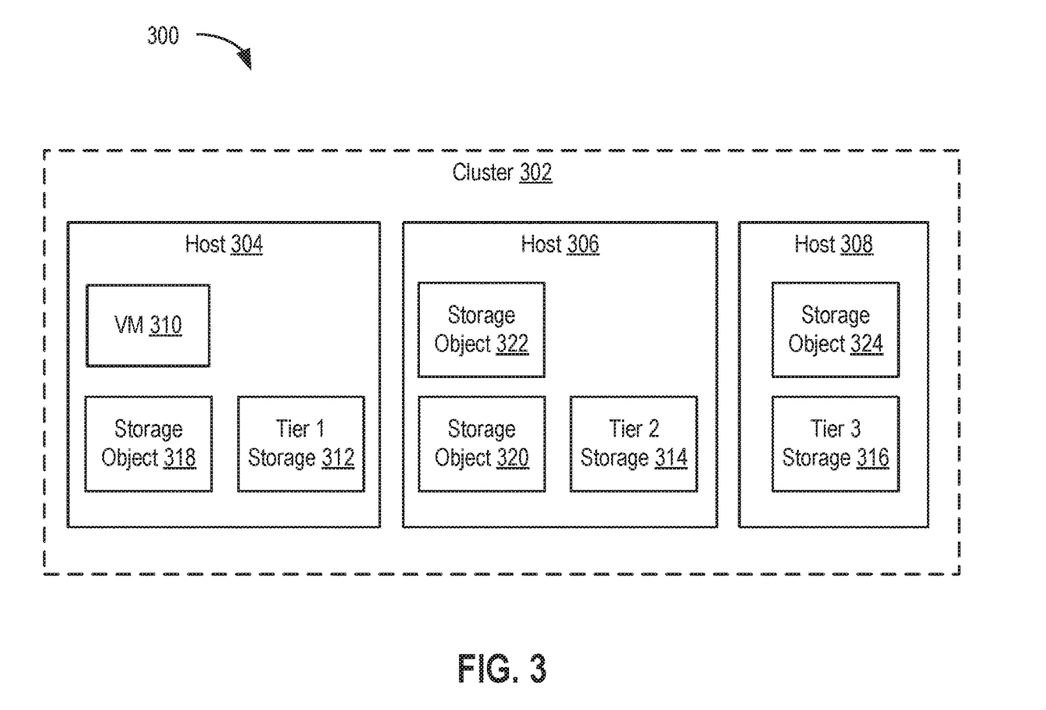
FIG. 3 is a block diagram depicting an example allocation of storage objects for a VM across storage tiers according to an example.

FIG. 3 is a block diagram depicting an example allocation 300 of storage objects for a VM across storage tiers according to an example. In this example, a cluster 302 includes three hosts 304, 306, and 308. Host 304 includes a VM 310 executing therein. Host 304 includes storage 312 that is assigned to tier 1 (e.g., NVMe storage). Host 306 includes storage 314 that is assigned to tier 2 (e.g., SSD storage). Host 308 include storage 316 that is assigned to tier 3 (e.g., HDD storage). VM 310 includes storage objects 318, 320, 322, 324. Storage object 318 (e.g., a VMDK) is stored in storage 312. Storage objects 320 and 322 (e.g., swap, another VMDK) are stored in storage 314. Storage object 324 (e.g., snapshots) is stored in storage 316.

Figure 4:
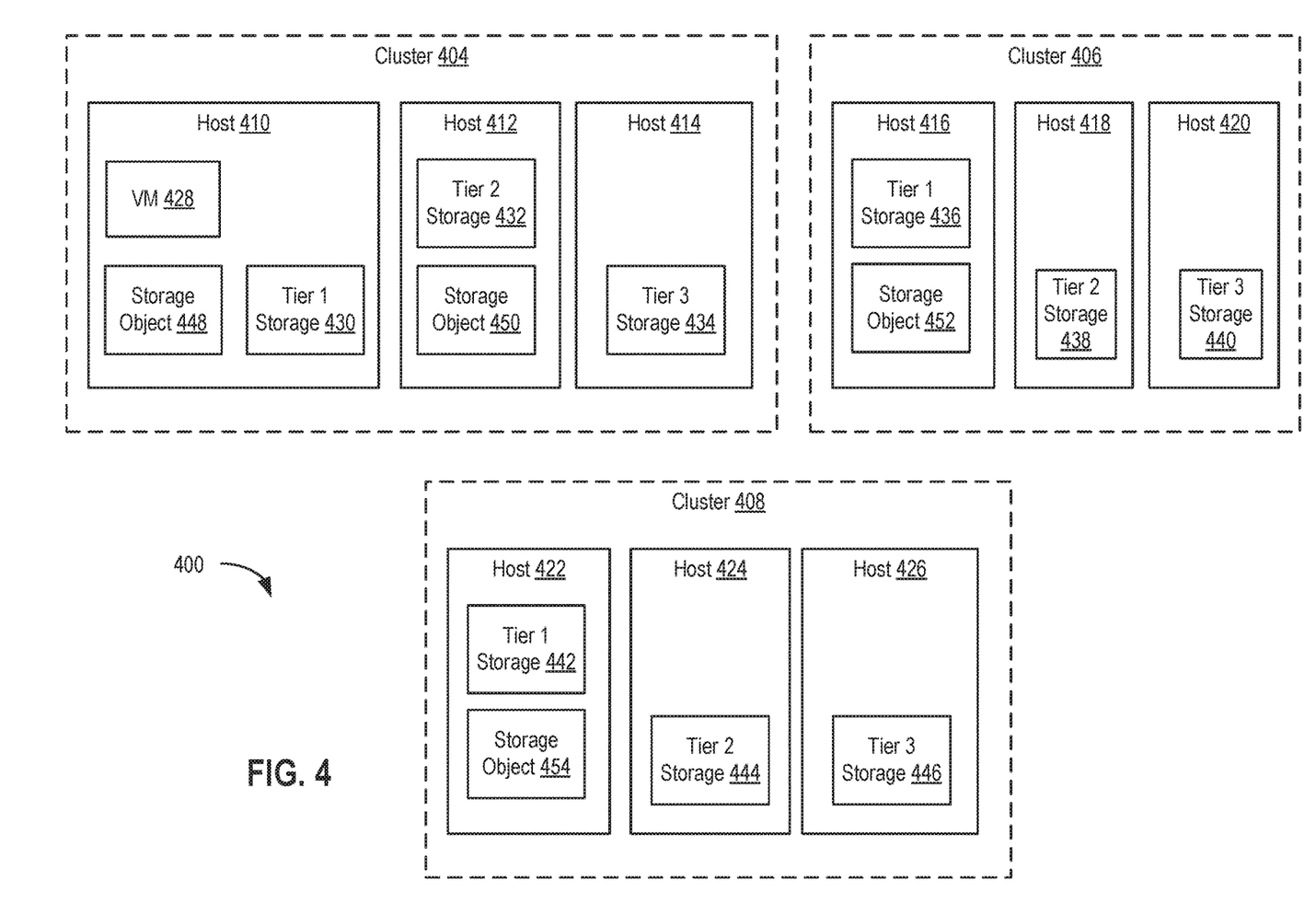
FIG. 4 is a block diagram depicting an example allocation of storage objects for a VM across storage tiers according to an example.

FIG. 4 is a block diagram depicting an example allocation 400 of storage objects for a VM across storage tiers according to an example. In this example, a cluster group 402 includes clusters 404, 406, and 408. Cluster 404 includes hosts 410, 412, and 414. Cluster 406 includes hosts 416, 418, 420. Cluster 408 includes hosts 422, 424, and 426. Host 410 includes a VM 428 and storage 430 assigned to tier 1. Host 412 includes storage 432 assigned to tier 2. Host 414 includes storage 434 assigned to tier 3. Host 416 includes storage 436 assigned to tier 1. Host 418 include storage 438 assigned to tier 2. Host 420 includes storage 440 assigned to tier 3. Host 422 includes storage 442 assigned to tier 1. Host 424 include storage 444 assigned to tier 2. Host 426 include storage 446 assigned to tier 3. VM 428 includes storage objects 448, 450, 452, and 454. Storage object 448 is stored in storage 430. Storage object 450 is stored in storage 432. Storage object 452 is stored in storage 436 (in a different cluster). Storage object 454 is stored in storage 442 (in a different cluster).

Figure 5:
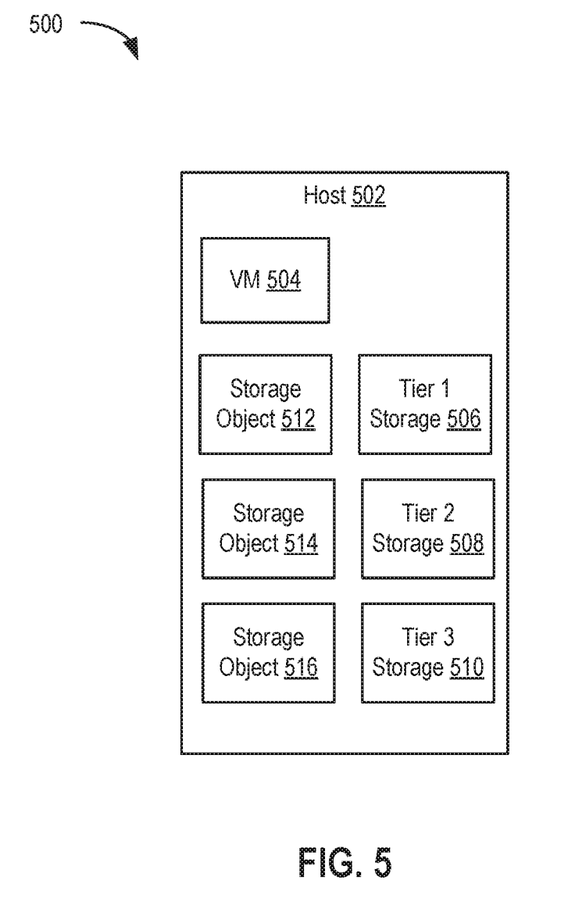
FIG. 5 is a block diagram depicting an example allocation of storage objects for a VM across storage tiers according to an example.

FIG. 5 is a block diagram depicting an example allocation 500 of storage objects for a VM across storage tiers according to an example. In this example, there is a single host 502 having storage 506 assigned to tier 1, storage 508 assigned to tier 2, and storage assigned to tier 3. Host 502 includes a VM 504 having storage objects 512, 514, and 516. Storage object 512 is assigned to storage 506. Storage object 514 is assigned to storage 508. Storage object 516 is assigned to storage 510.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of allocating virtual disks of a virtual machine across storage devices in a computing system, comprising:
    collecting capabilities of the storage devices in the computing system;
    assigning a tier of a plurality of tiers to each of the storage devices in the computing system;
    collecting performance data for the storage devices across a period of time;
    obtaining a corresponding storage policy assigned for each virtual disk, each storage policy defining capabilities to be maintained for the corresponding virtual disk during allocation, wherein the capabilities to be maintained for the corresponding virtual disk include, at least one of, input/output (I/O) latency, a protection scheme, storage type, or capacity;
    analyzing the performance data, the capabilities of the storage devices, and each storage policy to determine a placement of each of the virtual disks of the virtual machine across the plurality of tiers, wherein analyzing the performance data, the capabilities of the storage devices, and each storage policy to determine the placement of each of the virtual disks of the virtual machine across the plurality of tiers comprises:
        determining busiest subsets of time for the storage devices over the period of time based on the capabilities of the storage devices and the performance data for the storage devices collected across the period of time; and
        determining upcoming workloads for the storage devices using the determined busiest subsets of time, wherein the upcoming workloads are analyzed to determine the placement of each of the virtual disks; and
    moving each of the virtual disks to respective ones of the storage devices based on the assigned tiers.

2. The method of claim 1, wherein the capabilities of the storage devices include I/O characteristic, storage latency, network latency, and capacity characteristics.

3. The method of claim 1, wherein the storage devices are disposed in a host computer.

4. The method of claim 1, wherein the storage devices are disposed in a plurality of host computers of a cluster, and wherein the placement of virtual disks includes distributing the virtual disks across the storage devices in different ones of the plurality of hosts computers.

5. The method of claim 1, wherein the storage devices are disposed in a plurality of host computers of a plurality of clusters, and wherein the placement of virtual disks includes distributing the virtual disks across the storage devices in different ones of the plurality of hosts computers of the plurality of clusters.

6. The method of claim 5, wherein the plurality of clusters includes a cloud computing system and an on-premises computing system.

7. A non-transitory computer readable medium comprising instructions, which when executed in a computer system, causes the computer system to carry out a method of allocating virtual disks of a virtual machine across storage devices in a computing system, the method comprising:
    collecting capabilities of the storage devices in the computing system;
    assigning a tier of a plurality of tiers to each of the storage devices in the computing system;
    collecting performance data for the storage devices across a period of time;
    obtaining a corresponding storage policy assigned for each virtual disk, each storage policy defining capabilities to be maintained for the corresponding virtual disk during allocation, wherein the capabilities to be maintained for the corresponding virtual disk include, at least one of, input/output (I/O) latency, a protection scheme, storage type, or capacity;
    analyzing the performance data, the capabilities of the storage devices, and each storage policy to determine a placement of each of the virtual disks of the virtual machine across the plurality of tiers, wherein analyzing the performance data, the capabilities of the storage devices, and each storage policy to determine the placement of each of the virtual disks of the virtual machine across the plurality of tiers comprises:
        determining busiest subsets of time for the storage devices over the period of time based on the capabilities of the storage devices and the performance data for the storage devices collected across the period of time; and
        determining upcoming workloads for the storage devices using the determined busiest subsets of time, wherein the upcoming workloads are analyzed to determine the placement of each of the virtual disks; and
    moving each of the virtual disks to respective ones of the storage devices based on the assigned tiers.

8. The non-transitory computer readable medium of claim 7, wherein the capabilities of the storage devices include I/O characteristic, storage latency, network latency, and capacity characteristics.

9. The non-transitory computer readable medium of claim 7, wherein the storage devices are disposed in a host computer.

10. The non-transitory computer readable medium of claim 7, wherein the storage devices are disposed in a plurality of host computers of a cluster, and wherein the placement of virtual disks includes distributing the virtual disks across the storage devices in different ones of the plurality of hosts computers.

11. The non-transitory computer readable medium of claim 7, wherein the storage devices are disposed in a plurality of host computers of a plurality of clusters, and wherein the placement of virtual disks includes distributing the virtual disks across the storage devices in different ones of the plurality of hosts computers of the plurality of clusters.

12. The non-transitory computer readable medium of claim 11, wherein the plurality of clusters includes a cloud computing system and an on-premises computing system.

13. A computing system, comprising:
a memory configured to store program code; and
a processor, coupled to the memory, configured to execute the program code to perform allocation of virtual disks of a virtual machine across storage devices in the computing system, comprising:
collecting capabilities of the storage devices in the computing system;
assigning a tier of a plurality of tiers to each of the storage devices in the computing system;
collecting performance data for the storage devices across a period of time;
obtaining a corresponding storage policy assigned for each virtual disk, each storage policy defining capabilities to be maintained for the corresponding virtual disk during allocation, wherein the capabilities to be maintained for the corresponding virtual disk include, at least one of, input/output (I/O) latency, a protection scheme, storage type, or capacity;
analyzing the performance data, the capabilities of the storage devices, and each storage policy to determine a placement of each of the virtual disks of the virtual machine across the plurality of tiers, wherein analyzing the performance data, the capabilities of the storage devices, and each storage policy to determine the placement of each of the virtual disks of the virtual machine across the plurality of tiers comprises:
determining busiest subsets of time for the storage devices over the period of time based on the capabilities of the storage devices and the performance data for the storage devices collected across the period of time; and
determining upcoming workloads for the storage devices using the determined busiest subsets of time, wherein the upcoming workloads are analyzed to determine the placement of each of the virtual disks; and
moving each of the virtual disks to respective ones of the storage devices based on the assigned tiers.

14. The computing system of claim 13, wherein the capabilities of the storage devices include I/O characteristic, storage latency, network latency, and capacity characteristics.

15. The computing system of claim 13, wherein the storage devices are disposed in a host computer.

16. The computing system of claim 13, wherein the storage devices are disposed in a plurality of host computers of a cluster, and wherein the placement of virtual disks includes distributing the virtual disks across the storage devices in different ones of the plurality of hosts computers.

17. The computing system of claim 13, wherein the storage devices are disposed in a plurality of host computers of a plurality of clusters, and wherein the placement of virtual disks includes distributing the virtual disks across the storage devices in different ones of the plurality of hosts computers of the plurality of clusters.

* * * * *